United States Patent
Xu et al.

(10) Patent No.: US 9,392,436 B2
(45) Date of Patent: Jul. 12, 2016

(54) METHOD AND APPARATUS FOR VOICE OVER LTE

(71) Applicant: iBasis, Inc., Burlington, MA (US)

(72) Inventors: Richard H. Xu, Wakefield, MA (US); Hwan Jang Tang, Concord, MA (US)

(73) Assignee: iBasis, Inc., Lexington, MA (US)

( * ) Notice: Subject to any disclaimer, the term of this patent is extended or adjusted under 35 U.S.C. 154(b) by 99 days.

(21) Appl. No.: 14/212,290

(22) Filed: Mar. 14, 2014

(65) Prior Publication Data

US 2014/0269510 A1    Sep. 18, 2014

Related U.S. Application Data

(60) Provisional application No. 61/793,404, filed on Mar. 15, 2013.

(51) Int. Cl.
| | |
|---|---|
| *H04L 1/00* | (2006.01) |
| *H04W 8/12* | (2009.01) |
| *H04L 29/06* | (2006.01) |
| *H04W 40/02* | (2009.01) |
| *H04W 8/06* | (2009.01) |

(52) U.S. Cl.
CPC .............. *H04W 8/06* (2013.01); *H04L 65/1006* (2013.01); *H04L 65/1033* (2013.01); *H04L 65/1066* (2013.01); *H04L 65/1069* (2013.01); *H04L 65/1073* (2013.01); *H04W 40/02* (2013.01); *H04L 65/1016* (2013.01); *H04W 8/12* (2013.01)

(58) Field of Classification Search
CPC ............ H04L 65/1016; H04L 65/1069; H04L 65/1006; H04L 65/1033; H04L 65/1066; H04L 65/1073; H04W 80/04; H04W 84/042; H04W 8/12; H04M 15/56
See application file for complete search history.

(56) References Cited

U.S. PATENT DOCUMENTS

2015/0156221 A1*  6/2015  Abtin et al. .......... H04L 65/1016

FOREIGN PATENT DOCUMENTS

WO    WO 2013064397 A1 *  5/2013

OTHER PUBLICATIONS

"3rd Generation Partnership Project; Technical Specification Group Core Network and Terminals; IP Multimedia Call Control Protocol Based on Session Initiation Protocol (SIP) and Session Description Protocol (SDP); Stage 3; Release 11," *3GPP TS 24.229, V11.6.0*, (Dec. 2012), 777 pages.

(Continued)

*Primary Examiner* — Ayaz Sheikh
*Assistant Examiner* — Debebe Asefa
(74) *Attorney, Agent, or Firm* — Hamilton, Brook, Smith & Reynolds, P.C.

(57) ABSTRACT

According to at least one example embodiment, a transit network is configured to handle signaling messages between service provider networks. Upon receiving, at the transit network, a session control message from a mobile network, a signaling type associated with the session control message is determined. The transit network then routes the session control message based on the signaling type determined. According to at least one aspect, the session control message is routed based on domain routing if the determined signaling type is roaming signaling. According to at least one other aspect, the session control message is routed based on called party number routing if the determined signaling type is non-roaming signaling.

31 Claims, 10 Drawing Sheets

(56) References Cited

OTHER PUBLICATIONS

"3rd Generation Partnership Project; Technical Specification Group Core Network and Terminals; Inter-IMS Network to Network Interface (NNI); Release 11," *3GPP TS 29.165, V11.5.0*, (Dec. 2012), 127 pages.

"3rd Generation Partnership Project; Technical Specification Group Services and System Aspects; General Packet Radio Service (GPRS) Enhancements for Evolved Universal Terrestrial Radio Access Network (E-UTRAN) Access; Release 11," *3GPP TS 23.401, V11.0.0*, (Dec. 2012), 287 pages.

"GSMA LTE Roaming Guidelines, Version 7.0," *GSM Association; Official Document IR.88*, (Jan. 31, 2012), 42 pages.

Ericsson, ST-Ericsson, "Indication of NNI Routeing Scenarios in SIP Requests," 3GPP TS 24.802, 3GPP TSG CT WG3 Meeting #72, San Jose del Cabo, Mexico, Jan.-Feb. 2013.

Notification of Transmittal of the International Search Report and the Written Opinion of the International Searching Authority, or the Declaration, for PCT/US2014/027958, mailed on Jul. 31, 2014, 10 pages.

\* cited by examiner

METHOD AND APPARATUS FOR VOICE OVER LTE

RELATED APPLICATION

This application claims the benefit of U.S. Provisional Application No. 61/793,404, filed on Mar. 15, 2013. The entire teachings of the above application are incorporated herein by reference.

BACKGROUND

Wireless communications systems such as the Long Term Evolution (LTE) mobile communications system, also referred to as Evolved Packet System (EPS) or 4th Generation (4G) system, the Global System for Mobile (GSM) communications, or the Wideband Code Division Multiple Access (W-CDMA) mobile communications system, typically enable roaming services. Network operators of such wireless communications systems offer roaming services to their subscribers, therefore allowing the subscribers to stay connected even as they travel across different regions or countries.

The IP Multimedia Subsystem or IP Multimedia Core Network Subsystem (IMS) is an architectural framework for delivering IP multimedia services. Voice over LTE (VoLTE) is a voice service that uses IMS and the LTE IP Core to handle IP based signaling, e.g., Session Initiated Protocol (SIP), and media, e.g., Real-Time Protocol (RTP), enabling a user's user equipment (UE) to make/receive a voice call to/from any other user reachable via mobile, fixed line or IP based telecommunication networks.

SUMMARY

Issues arise when dealing with both Roaming and Non-Roaming Network to Network Interface (NNI) within a typical transit network, which normally is capable of only handling interworking voice over IMS using the Non-Roaming NNI, but not the new Roaming II-NNI. The Roaming II-NNI was recently introduced by 3GPP standard body to support VoLTE roaming in a visited LTE network with similar VoLTE system. However, in order for a visited LTE network to enable a roamer to use its VoLTE service offered at a home LTE network, IMS/VoLTE service elements, such as, proxy-call session control function (P-CSCF), IBCF, TrGW, Transit and Roaming Function (TRF), etc., are deployed at the visited LTE network. Deployment of such network elements presents a significant investment for network operators. However, without deploying at least some of the IMS/VoLTE service elements, VoLTE roaming service will be impeded.

Embodiments of the present disclosure are directed to addressing the above-referenced issues by deploying such IMS/VoLTE service elements at a transit network, and enabling the transit network to perform functions that are otherwise performed by the home or visited networks. In addition, example embodiments described in the present disclosure are configured to enhance a transit network to efficiently route a call to a designated user with learned routing information when dealing with Roaming II-NNI.

According to at least one example embodiment, a method includes receiving, at a transit network, a session control message from a mobile network. A signaling type associated with the session control message is determined at the transit network. The transit network then routes the session control message based on the signaling type determined. According to at least one aspect, the session control message is routed based on domain routing if the determined signaling type is roaming signaling. According to at least one other aspect, the session control message is routed based on called party number routing if the determined signaling type is non-roaming signaling.

The session control message may be a Session Initiation Protocol (SIP) INVITE message having a message header. The signaling type may be determined as roaming signaling if TRF information is present in the message header. However, if TRF information is absent from the message header, the signaling type is determined as non-roaming signaling if the session control message is not received from a visited mobile network, e.g., the session control message is sent from a home mobile network and is sent to a user in another mobile network through the transit network where interworking functions are handled. Routing based on domain routing may include routing the SIP INVITE message having TRF information present in the message header to an originating visited mobile network if the message header further includes a loopback indicator, otherwise routing the SIP INVITE message having TRF information present in the message header to a home mobile network.

According to at least one other example embodiment, a method includes receiving, at a transit network, a registration request message from a visited mobile network, and collecting, at the transit network, first information from the registration request message. The registration request message is routed to a home mobile network. The method may further include receiving, at the transit network, a registration response message from the home mobile network. The transit network collects second information from the registration response message, and routes the registration response message to the visited mobile network. The collected first and second information may be analyzed to make a routing decision for called party based routing.

According to at least one other example embodiment, a method includes receiving, at a transit network, a routing request for a call from a service element, the routing request including called party information. The transit network compares the called information against learned routing information in a database, and routes the call based on learned routing information if the comparison indicates a match, otherwise routes the call based on default routing information. The learned routing information may be based on information collected from registration messages associated with roaming calling and/or from call termination records.

In yet other example embodiments, a method includes receiving, at a transit network, a Session Initiation Protocol (SIP) INVITE message associated with a call originating from a visited mobile network mobile network. The transit network detects absence of TRF information in a message header of the SIP INVITE message, and modifies the message header of the SIP INVITE message to include TRF information associated with the transit network. The modified SIP INVITE message is then routed to a home mobile network. The method may further include receiving, at the transit network, from the home mobile network, a SIP INVITE having a loopback indicator in the message header; and handling, at the transit network, delivery of the call on behalf of the visited mobile network.

In accordance with an embodiment, a transit network system includes network service elements for providing voice-over-long term evolution (VoLTE) services. At least one of the network service elements is configured to perform the methods described above. The hosted network service elements may include, for example, a transit and roaming function (TRF) service element, a Proxy-Call Session Control Function (P-CSCF) service element, a Packet Data Network Gateway (P-GW) service element and/or a Policy and Charging Rules Function (PCRF) service element.

Further, yet another example embodiment may include a non-transitory computer-readable medium having stored thereon a sequence of instructions which, when loaded and executed by a processor, causes the processor to execute the methods described above.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

A description of example embodiments of the invention follows.

The teachings of all patents, published applications and references cited herein are incorporated by reference in their entirety.

Figure 1:
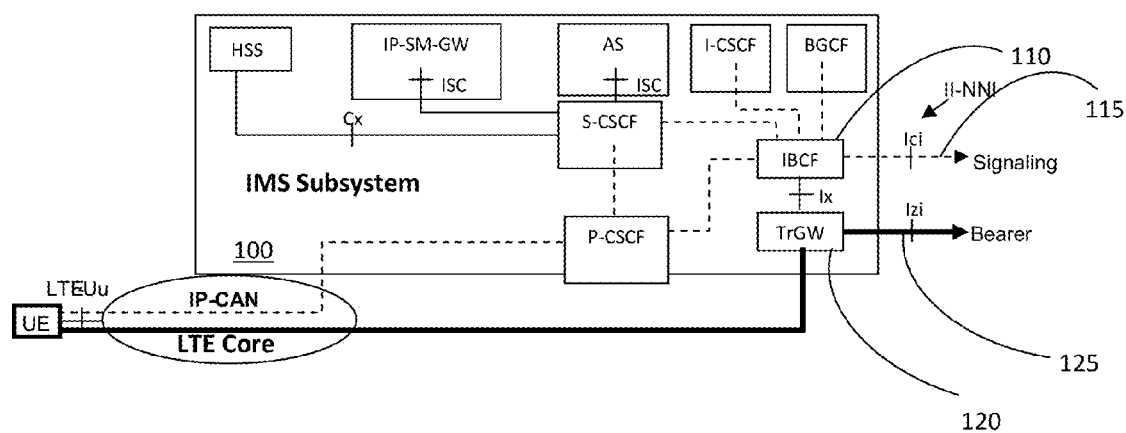
FIG. 1 is a block diagram illustrating a typical reference architecture for a VoLTE system in an LTE Core network.

FIG. 1 is a block diagram illustrating a typical reference architecture for a VoLTE system in an LTE Core network. The Interconnect Border Control Function (IBCF) 110 and the Transaction Gateway (TrGW) 120 are two network elements configured to enable a VoLTE operator to route a call from its own network to reach other users at a different network or route a call from a visiting VoLTE user to reach any user at local or remote networks.

The interfaces, Ici 115 and Izi 125, defined in 3GPP TS 29.165, handle the signaling and voice media, respectively, with other similar networks or with a transit network. The transit network is configured to receive calls from one network and deliver the calls to another network.

Figure 2:
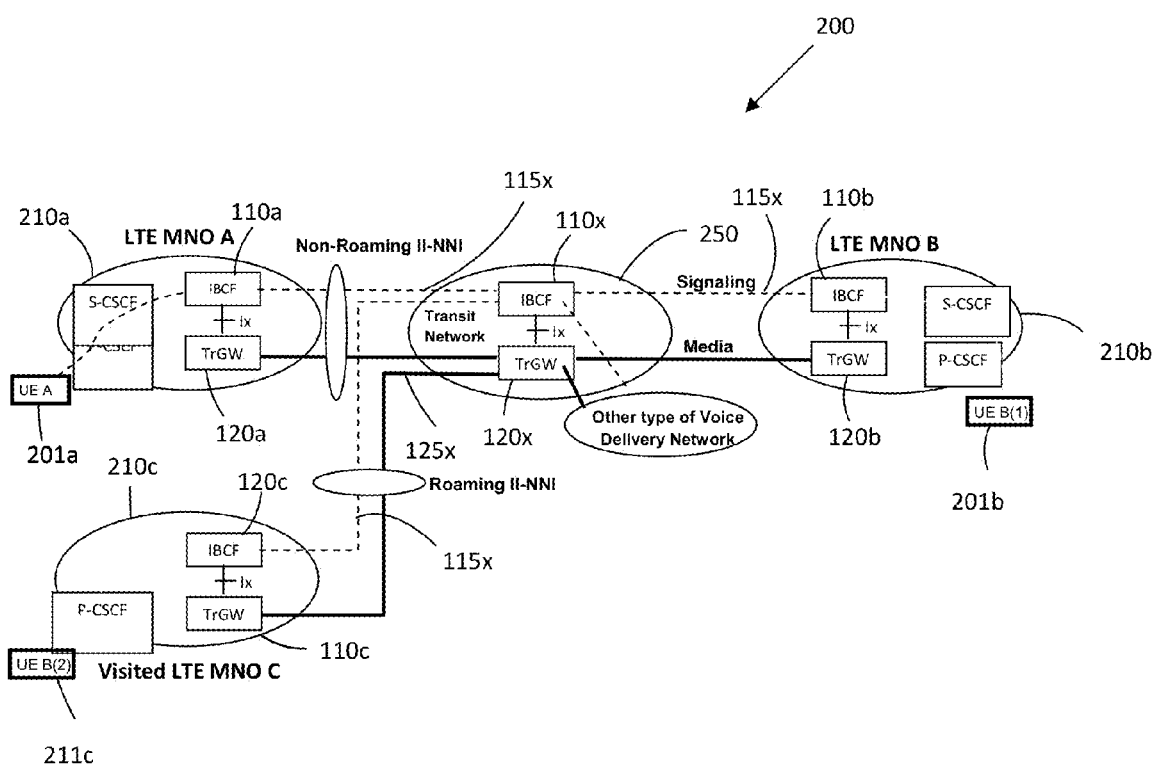
FIG. 2 is a block diagram illustrating a reference architecture of a communications system including a transit network.

FIG. 2 is a block diagram illustrating a reference architecture of a communications system including a transit network 250. The transit network 250 includes an IBCF 110x and TrGW 120x network elements. The IBCF 110x in the transit network 250 is coupled to other IBCF network elements, 110a, 110b, and 110c, residing respectively in the LTE mobile networks 210a, 210b, and 210c, through Ici interfaces 115x. The TrGW 120x in the transition network 250 is coupled to other TrGW, 120a, 120b, and 120c, residing respectively in the LTE mobile networks 210a, 210b, and 210c, through Izi interfaces 125x. The type of the Ici 115x and Izi 125x interfaces depend on the type of VoLTE traffic associated with the LTE mobile network, e.g., 210a, 210b, or 210c, connected to the transit network 250. If the LTE network, e.g., 210a, sends the VoLTE call from its own users to users at another LTE network, e.g., 210b, the type of Ici and Izi interfaces, 115x and 125x, used is referred to as a Non-Roaming Inter-IMS Network to Network Interface (II-NNI). If LTE network, e.g., 210c, wants to enable a roaming user, e.g., 201c, from the LTE network 210c, to use its VoLTE system to make a call to any network, the type of Ici and Izi interfaces, 115x and 125x, employed is referred to as a Roaming II-NNI.

Figure 3:
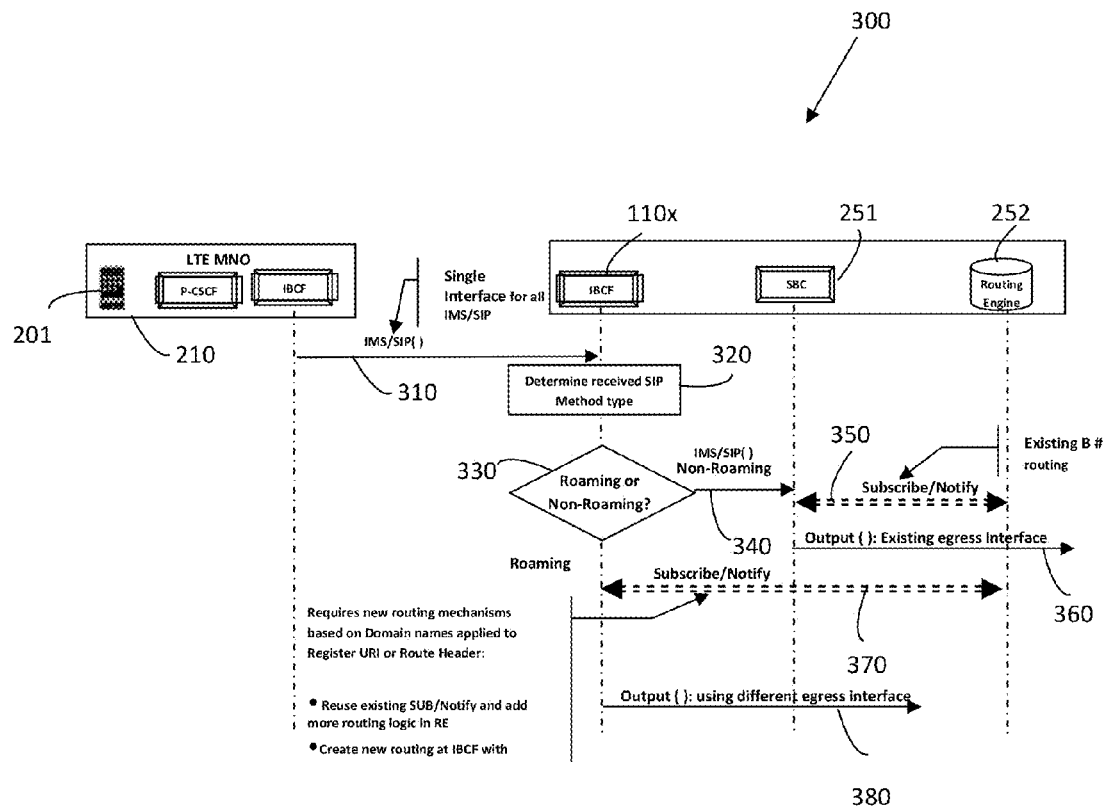
FIG. 3 is a flow chart illustrating a logic decision process, in the transit network, for handling roaming and non-roaming signaling for VoLTE, according to at least one example embodiment.

FIG. 3 is a flow chart illustrating a logic decision process 300 in a transit network 250 for handling roaming and non-roaming signaling for VoLTE, according to at least one example embodiment. The transit network 250, or typical voice termination network, uses a session border element, called a Session Border Controller (SBC) 251, to receive calls from service provider networks and deliver the calls to the corresponding destination or called party number via an appropriate termination network determined by an internal routing engine 252. The routing engine 252 determines or selects a termination network to be used for delivery of the received call based on the called party number, also referred to herein as B party number.

A different routing mechanism, called domain-based routing, is employed when a roamer is trying to register his VoLTE client to his home network via the transit network 250, or make a call which involves call setup signaling to reach to the home network first via the transit network 250. In such a case, a routing decision is determined by the home network. In domain-based routing, domain information is used to determine which path or next hop the call is to be forwarded to in order to reach to the designated home network. Aspects of domain-based routing are described in RFC 3261 "SIP: Session Initiation Protocol".

According to at least one example embodiment, in order to handle both types of signaling, roaming and non-roaming, the IBCF 110x is introduced as a border element in the transit network 250 to interface with both Non-Roaming and Roaming II-NNI. The IBCF 110x is configured to receive all types of IMS signaling without imposing any special requirements to a connected LTE network 210. In existing transit networks, the SBC, e.g., 251, does not have the capability to distinguish between roaming and non-roaming signaling. As such, by introducing the IBCF 110x, the transit network 250 is enabled to make such distinction and route signaling messages accordingly. The IBCF 110x may be introduced as a separate network element or as a module within an existing network element of the transit network 250.

According to at least one aspect, upon receiving an IMS/SIP message 310, the IBCF 110x determines at 320 the signaling type associated with the IMS/SIP message 310 received. At 330, if the message 310 is a non-roaming type of call message, e.g., a SIP INVITE representing a caller from one network calling another user in a different network, the routing engine 252 is queried, 340 and 350, and the call is delivered 360 based on called party routing. However, if at 330 the message 310 is found to be a roaming type message, e.g., a SIP registration or a SIP INVITE, the message 310 is routed 380, using domain based routing. According to at least one aspect, the domain-based routing is handled by querying 370 a routing engine 252 configured to act as a common query interface for both roaming and non-roaming type messages. Alternatively, a separate routing engine may be configured to handle the domain-based routing.

Once routing information is determined, the roaming related message is forwarded 380 to an egress interface from which the designated home network is reachable. The egress interface may be provided at the SBC 251, the IBCF 110x or another border element to deliver the egress message to the designated home network.

For domain based routing, also referred to herein as Route Header based routing, a Service-Route Header may be obtained by the transit network IBCF 110x during a registration procedure. The Route Header is generated when the UE 201 initiates a SIP REGISTER to the home serving-call session control function (S-CSCF)/REGISTRAR (not shown in FIG. 3) for accessing certain services. The home S-CSCF/REGISTRAR responds with Service-Route Set to the UE 201. The UE 201 then uses the received Service-Route Header Set as the Route Header Set in subsequent SIP messages, such as INVITE. According to at least one example embodiment, if the REGISTER is processed by the transit network 250, the subsequent SIP messages are routed to the transit network IBCF 110x. For example, for a REGISTER message routed based on domain in the request-uniform resource identifier (R-URI), an indication of the transit network IBCF 110x is added into Record-Route into the REGISTER Request, and an indication of the transit network IBCF 110x is added into Service-Route Set as part of the path to access home services.

According to 3GPP TS 24.229, a roaming SIP INVITE is sent to the home network for a routing decision. The home network may decide to route the INVITE back, a so-called loopback INVITE, to the originating visited network, delegating the further routing decision to the visited network. Upon receiving the loopback INVITE, the visited network may deliver the call to any other network per its preference or policies. Such a loopback INVITE may cause confusion in the existing transit network 250 as it might treat the loopback INVITE as another newly received INVITE potentially causing an issue in handling the roaming call termination. According to at least one example embodiment, a logical decision process is employed in the transit network 250 to identify a type of an INVITE message.

Figure 4:
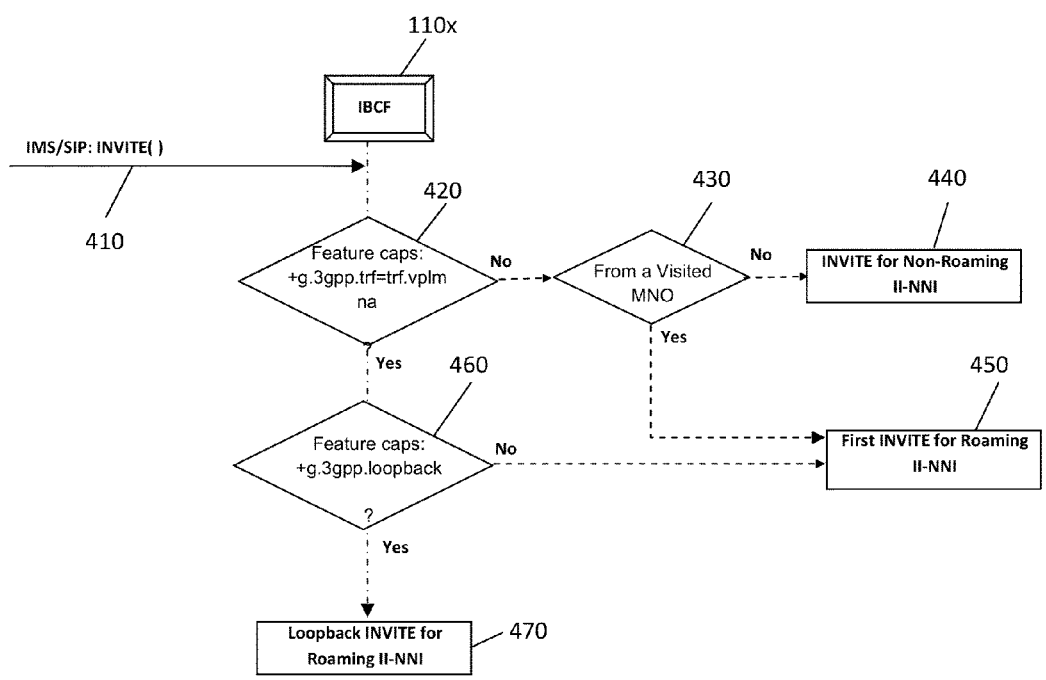
FIG. 4 is a flow chart illustrating a logical decision process performed within the transit network to identify a type of a received INVITE message, according to at least one example embodiment.

FIG. 4 is a flow chart illustrating a logical decision process 400 performed at the IBCF 110x of the transit network 250 to identify a type of a received INVITE message, according to at least one example embodiment. According to at least one aspect, the process 400 is employed to overcome any potential confusion regarding the type of the INVITE message 410 received at the IBCF 110x, and route the INVITE message 410 based on a corresponding determined type to ensure correct delivery of the roaming call. When receiving the INVITE message 410, the IBCF 110x checks at 420 the message header to see whether there is a special header, called Feature Cap. If the Feature Cap header is absent, or absent the TRF information, a check is made at 430 to determine whether the INVITE is received from a visited network, e.g., based on pre-configured or agreed upon special source and destination IP addresses or port numbers between the visited network and the transit network 250. If, at 430, the INVITE message 410 is determined to be received from a visited network without the designated Feature Cap, such INVITE message is treated at 450 as roaming and a special handling of the INVITE message 410 is described herein below with reference to FIG. 9. If, at 430, the INVITE message 410 is determined not to be received from a visited network, it is routed, at 440, based on the called party number to deliver the call to another network.

However, if, at 420, the Feature Cap header is determined to be present and it contains TRF information from the originating visited network, the IBCF 110x determines at 460 whether the message header includes another Feature Cap with a loopback indicator. If no loopback indicator is found in the message header, at 460, then the received INVITE message 410 is handled 450 as the first roaming INVITE message received, and is routed, at 450, to the home network based on domain information in the Route header of the message 410. If it is determined that the received INVITE message 410 contains the Feature Cap with TRF information, at 420, and another Feature Cap with a loopback indicator, at 460, then the received INVITE message is treated, at 470, as a loopback INVITE message that is routed back to the originating visited network using domain based routing.

According to at least one example embodiment, a visited LTE network offering VoLTE roaming service to roamers from another LTE network is configured to support the UE, or VoLTE client, registration process between the visited VoLTE system and the Home VoLTE system via a transit IBCF 110x. Such registration signaling is recognized as Roaming II-NNI by the transit IBCF 110x.

Figure 5:
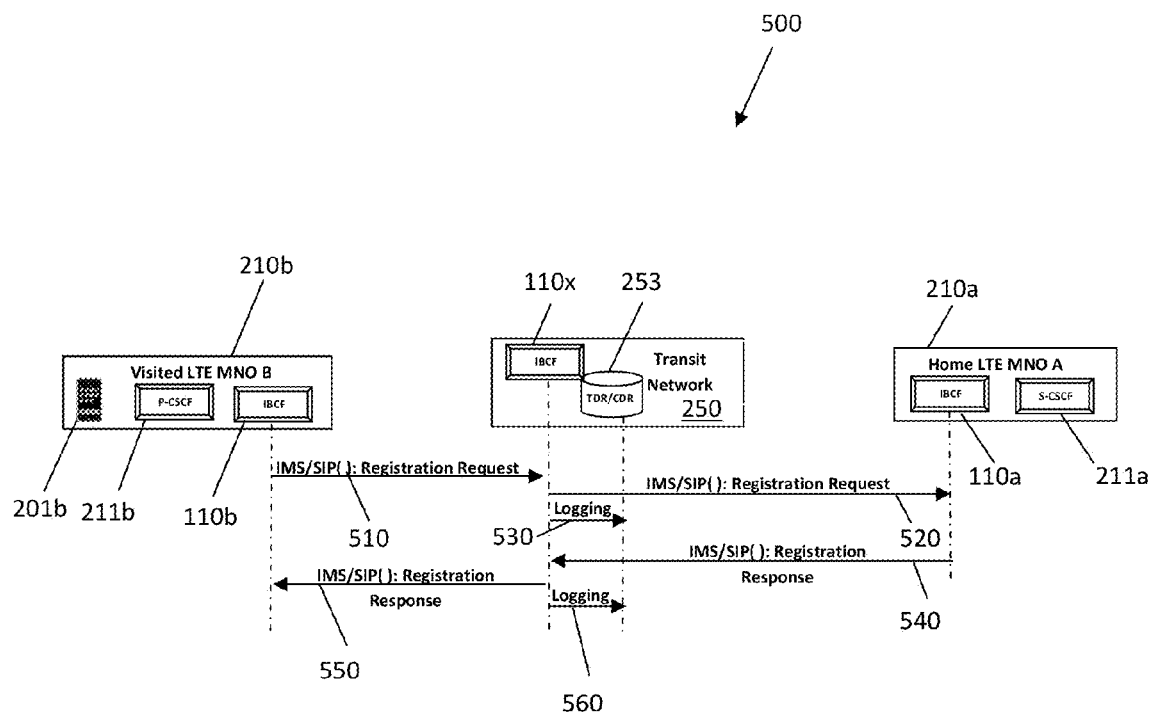
FIG. 5 is a signaling flow diagram illustrating signals exchanged between different entities with respect to a roaming registration process, according to at least one example embodiment.

FIG. 5 is a signaling flow diagram illustrating signals exchanged between different entities with respect to a roaming registration process 500, according to at least one example embodiment. According to at least one aspect, a UE 201b, associated with the home LTE network 210a, is roaming to the visited LTE network 210b. The roaming UE 201b initiates a VoLTE call through the P-CSCF 211b of the visited LTE network 210b, and a registration message 510 is sent from the IBCF 110b of the visited network to the IBCF 110x of the transit network 250. The IBCF 110x forwards 520 the registration message to the IBCF 110a of the home LTE network 210a for handling by the S-CSCF 211b. According to at least one aspect, the Transit IBCF 110x of the transit network 250 is configured to collect information from each such signaling message, e.g., SIP REGISTER request or IMS REGISTRATION request, and store 530 the collected information at a local database, e.g., a transaction data record or call detail record (TDR/CDR) database 253. According to at least one aspect, the information stored in the TDR/CDR database 253 is accessed and analyzed by another process in a real time fashion for enhanced routing decision making. Upon receiving a registration response message 540 from the IBCF 110a, of the home LTE network 210a, the IBCF 110x, in the transit network 110x, forwards 550 the registration response message to the IBCF 110b of the visited network. The IBCF 110x also collects information from the received registration response message 540 and stores 560 the collected information in the TDR/CDR database for use by other processes for enhanced routing decision making.

Figure 6:
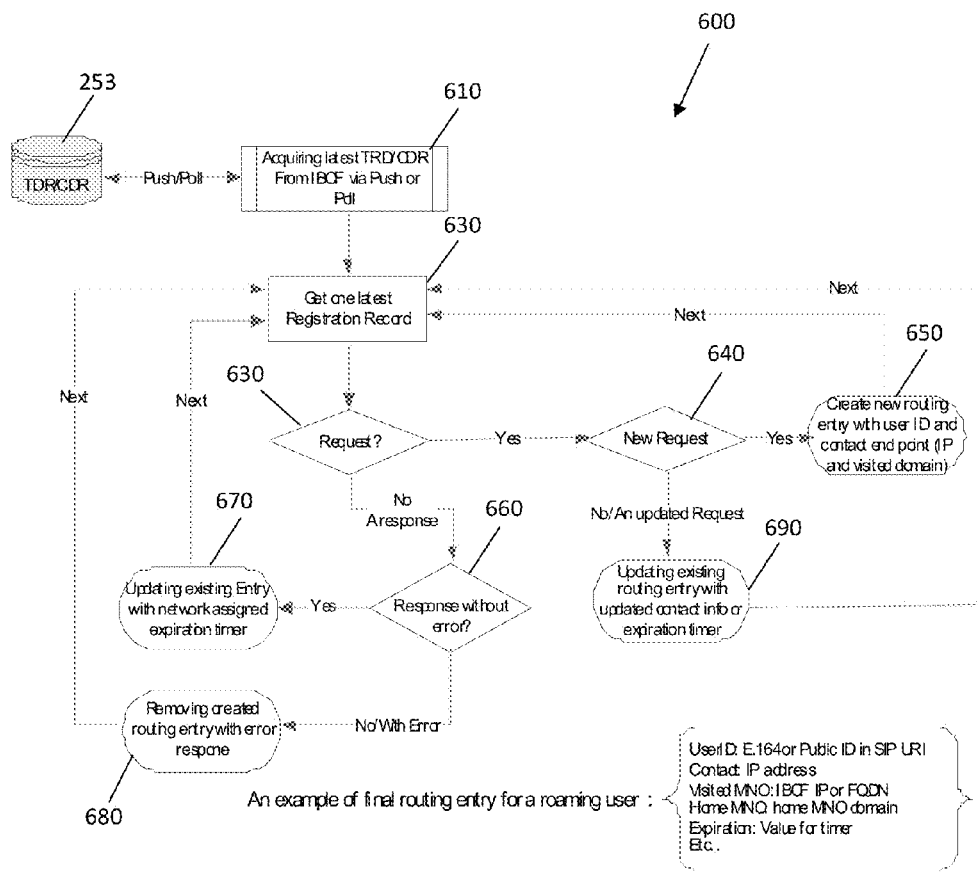
FIG. 6 is a flowchart illustrating a process for analyzing the collected roaming registration information to generate routing intelligence used to enhance the existing called party, B Number, based routing, according to at least one example embodiment.

FIG. 6 is a flowchart illustrating a process 600 for analyzing the collected roaming registration information to generate routing intelligence used to enhance the existing called party, B Number, based routing, according to at least one example embodiment. According to at least one aspect, the generated routing intelligence is used to deliver a call from a calling party to a roaming UE reachable via the transit network 250.

According to at least one example embodiment, registration transaction data records (TDRs) stored in the database 253 are acquired, by a network element of the transit network 250 via push or poll. According to at least one aspect, for each newly acquired TDR, a new routing record is generated for a roamer if the TDR is a new Registration request. In particular, at 620, a registration record, e.g., the latest registration record, is selected for processing. At 630, a determination is made regarding whether the registration record is associated with a registration request message. If the registration record is determined to be associated with a registration request message, a determination is made at 640 regarding whether such request is a new or updated request. If the request is determined to be a new request, a corresponding routing entry is created at 650. Such routing record may contain a user ID and the user client's contact IP address from a visited network in which the user is roaming. If the TDR is determined, at 630, to be associated with a Registration response, the registration response is checked, at 660, for potential error. If no error is detected, an existing routing record, associated with the registration response, is updated at 670 for the roamer, and a corresponding expiration timer is set indicating a valid period of the routing for the roamer if the response is successful without error. If the registration response is determined to include an error, at 660, the corresponding route record, created based on a corresponding initial registration request, is removed at 680. At 640, if the TDR is determined to be associated with an update request, no new routing record is created, and a corresponding existing routing record is updated, at 690 for the user if there is any new information in the registration request. According to at least one aspect, a valid routing record for a roamer may contain the roamer's identification, which is normally the roamer's mobile number, the roamer's IP contact point, which is a reachable IP address via the transit network 250, and other information related to the roamer's home and visited networks. The process 600 is repeated by processing a new CDR as indicated by the transitions, in FIG. 6, from the blocks 650, 670, 680 and 690 to 620.

Figure 7:
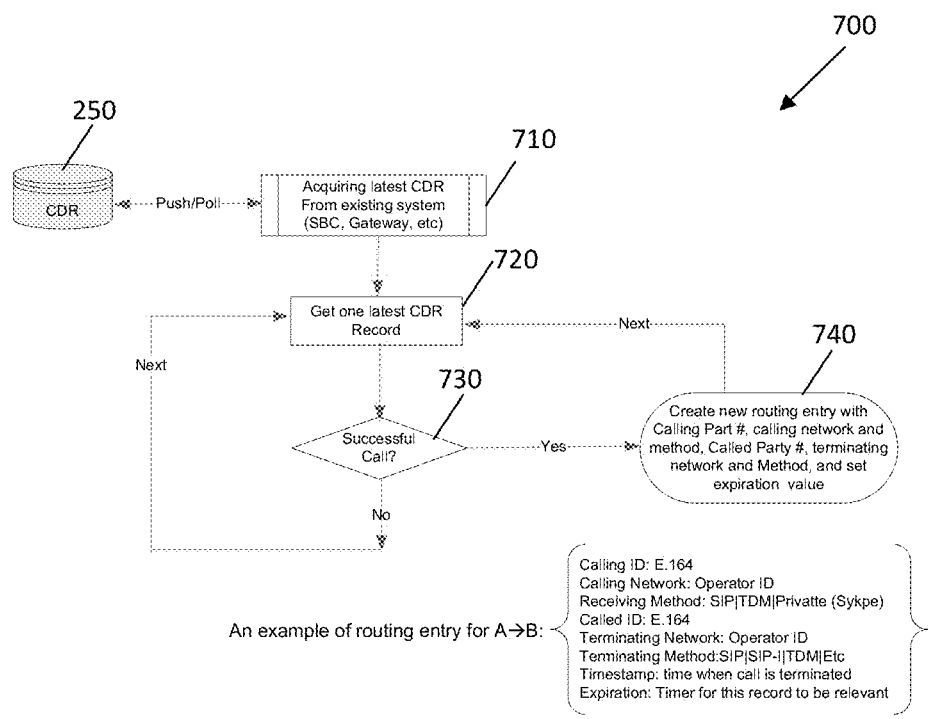
FIG. 7 is a flowchart illustrating a process for analyzing existing call termination records within the transit network, according to at least one example embodiment.

FIG. 7 is a flowchart illustrating a process 700 for analyzing existing call termination records within the transit network 250, according to at least one example embodiment. According to at least one aspect, call termination records are analyzed to learn the routing information between a calling party and a called party. According to at least one example embodiment, called detail records (CDRs) stored in the database 253 are acquired, by a network element of the transit network 250, via push or poll. According to at least one aspect, an acquired CDR, e.g., latest CDR, is selected for processing at 720. At 730, the CDR is checked to determine whether it indicates that it was a successful call record. If a successful call record is determined at 730, then a routing record, associated with the CDR, is generated at 740 to contain a calling party A and called party B at a time from one network to another network with specific delivery method, such as, SIP, SIP-I, or TDM. A timer is also set to indicate how long this record may be used for routing decisions used by an enhanced routing mechanism described herein below with reference to FIG. 8. If the CDR is determined, at 730, to indicate a non-successful call record, no routing entry is created or updated. The process 700 is repeated by processing a new CDR as indicated by the transitions, in FIG. 7, from 730 and 740 to 720.

Figure 8:
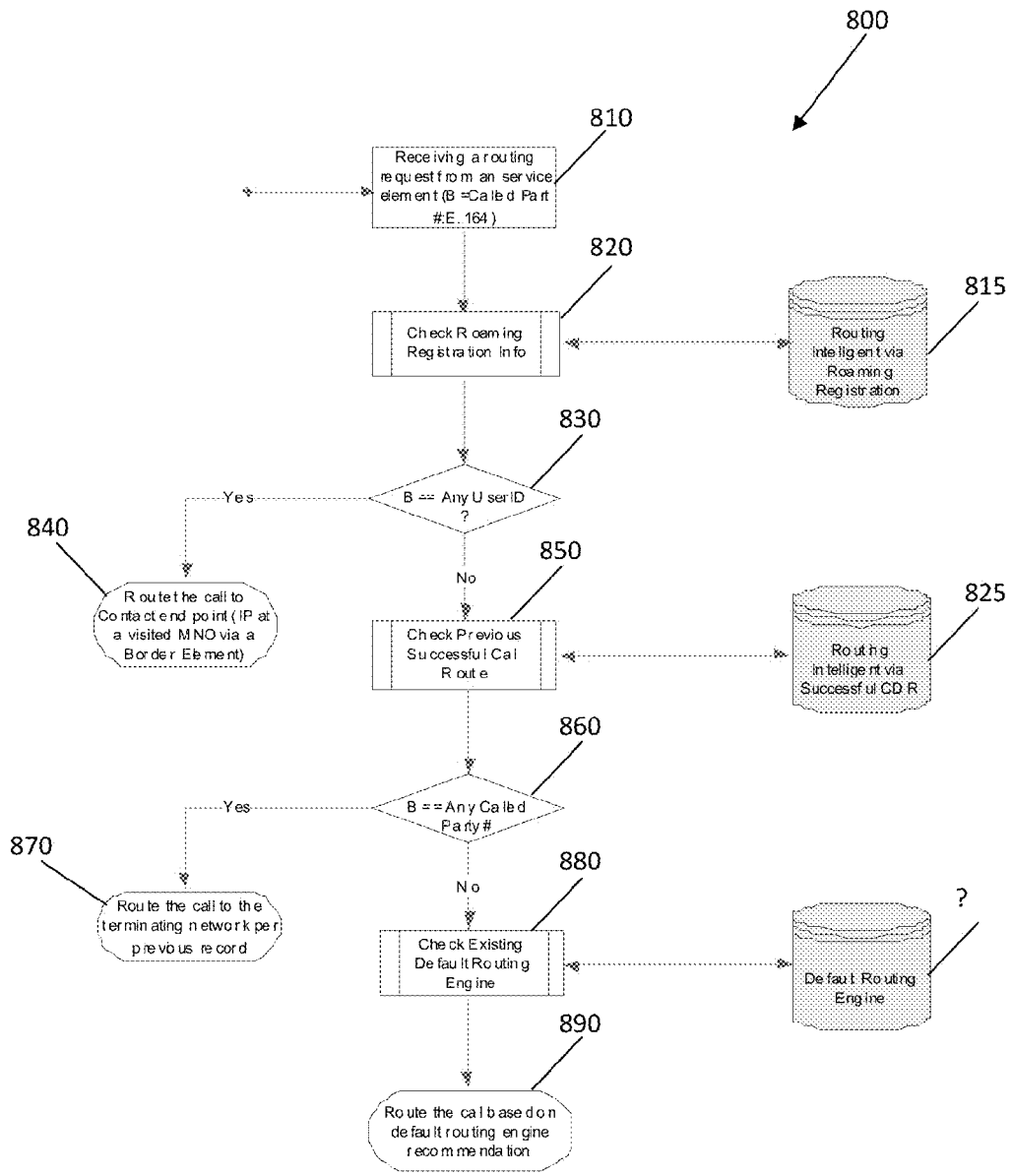
FIG. 8 is a flowchart illustrating an enhanced routing process 800 based on learned routing information, according to at least one example embodiment.

FIG. 8 is a flowchart illustrating an enhanced routing process 800 based on learned routing information, according to at least one example embodiment. In particular, called party, B Number, based routing may be enhanced with the learned routing intelligence indicated in the processes shown in FIGS. 6 and 7. When receiving, at 810, a routing request with a B party Number, a network element of the transit network 250 retrieves and checks, at 820, routing information generated by the process in FIG. 6. According to at least one aspect, the routing information is retrieved 820 from a corresponding database 815 generated and/or updated by the process described in FIG. 6. At 830, if the B Party Number is determined to match one of the valid records in the database 815, the call is delivered, at 840, to the B party with the contact IP address in the routing record. However, if it is determined at 830 that there is no match of the B party number from the database 815 generated by the process of FIG. 6, routing information generated by the process described in FIG. 7 is retrieved and checked at 850, for example, from a corresponding database 825. If it is determined at 860 that the B party number matches one of the records with the same B party number in the database 825, then the call is delivered 870 to the same B party with the same method and network indicated by the routing record. Otherwise, an existing default routing engine 835 is used, at 880, for the routing decision, and the call is delivered 890 accordingly.

Figure 9:
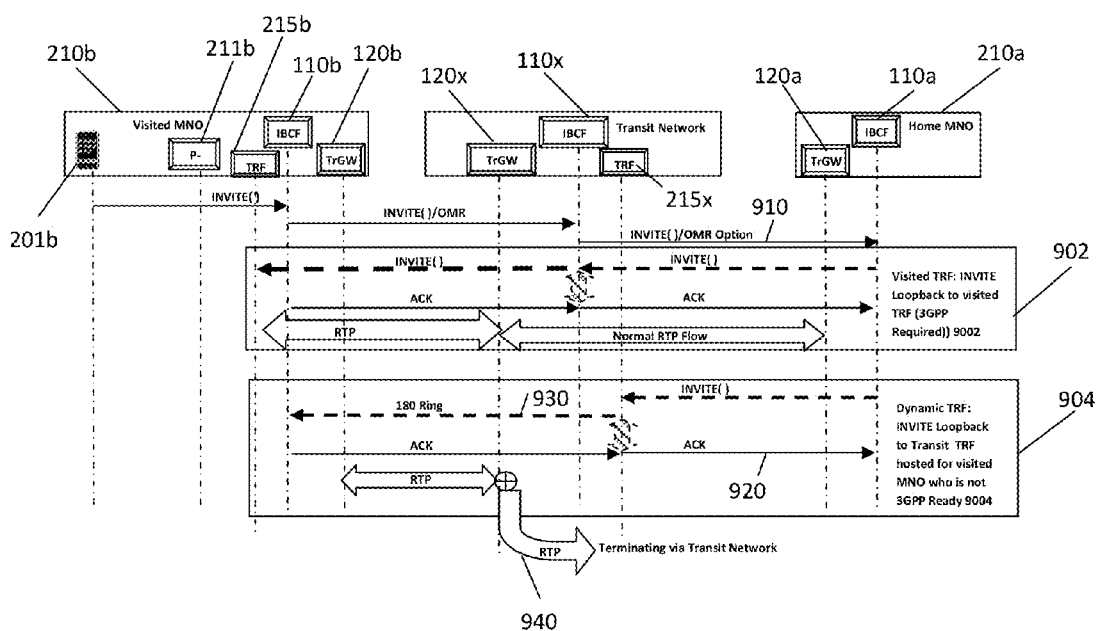
FIG. 9 is signaling flow diagram illustrating a process 900 of handling signaling messages at the transit network 250, according to at least one example embodiment.

FIG. 9 is signaling flow diagram illustrating a process 900 of handling signaling messages at the transit network 250, according to at least one example embodiment. The process 900 illustrates two scenarios for signals exchanged between different entities with respect to hosting TRF 215x in the transit network 250. According to at least one aspect, a first scenario is described by the first section of the flow 902, where the visited LTE network 210b is configured to support VoLTE roaming. Specifically, a TRF element 215b is employed at the visited LTE network 210b. With the employed TRF 215b, the visited network 210b is capable of handling loopback INVITE when a first INVITE message is sent to the home network 210a from a roamer's VoLTE client 201b. The SIP header called Feature Cap containing a fully qualified domain name (FQDN) of the TRF is embedded in the first INVITE message. The home LTE network may send the INVITE message back to the TRF element 215b of the visited LTE network 210b to further handle the call delivery. Such scenario usually results in an reliable voice quality due to a shorter media path as described in the Third Generation Partnership Project (3GPP) standard Specification document 3GPP TS 24.229.

According to at least one aspect, the TRF 215b may not be available in every visited LTE network, impeding the VoLTE roaming service for those roamers whose home network has offered VoLTE service at the home network 210a. According to at least one example embodiment, a mechanism, shown by the section of the flow 904, of manipulating the first INVITE message, which does not contain the TRF information, is used at the transit network 250 to enable VoLTE services for such roamers. In particular, upon receiving 910 an INVITE message from the IBCF 110b of the visited network 210b, the IBCF 110x of the transit network 250 adds TRF information to point to the TRF element 215x located within the transit network 250. As such, the home LTE network 210a sends 920 the modified INVITE message back to the TRF element 215x in the transit network 250, and the transit network 250 forwards 930 the INVITE message with the added TRF information to the visited network 210b. The call is then delivered 940 by the transit network 250 instead of the visited network 210b, therefore, achieving a similar call delivery with reliable quality.

As described above, the transit network 250 may dynamically introduce a TRF service element 215x to assist a visited LTE network 210b to enable VoLTE roaming service.

Figure 10:
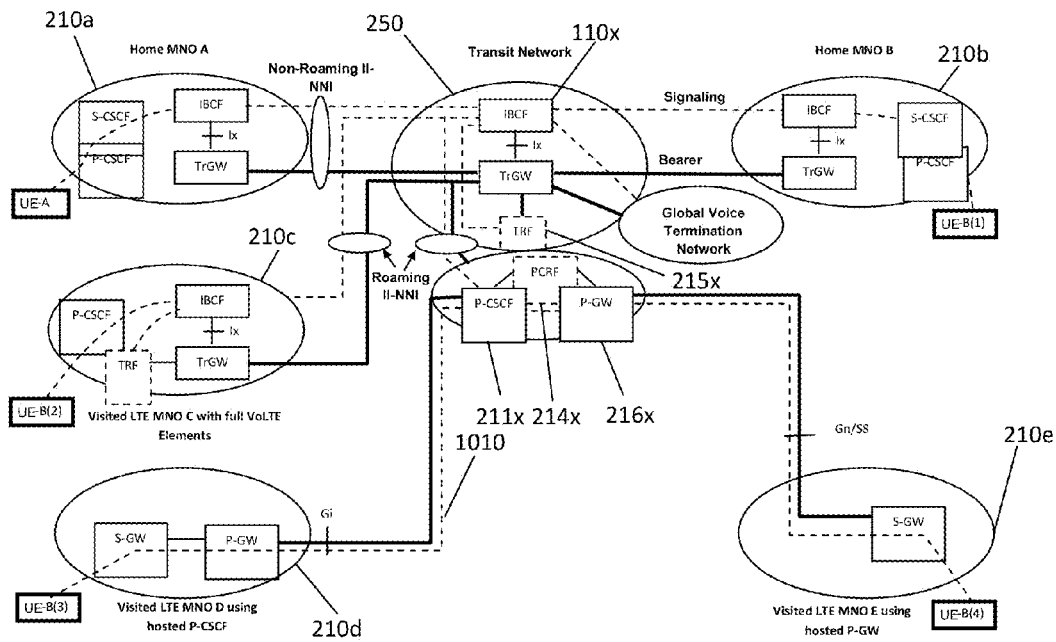
FIG. 10 is a diagram illustrating a network architecture, according to at least one example embodiment.

FIG. 10 is a diagram illustrating a network architecture, according to at least one example embodiment. According to at least one example embodiment, the transit network 250 includes additional network elements, e.g., Proxy-Call Session Control Function (P-CSCF) 211x, Packet Data Network Gateway (P-GW) 255x, Policy and Charging Rules Function (PCRF) 254x, to assist a variety of visited LTE networks to offer VoLTE roaming services. For example, a visited LTE network 210d may leverage hosted P-CSCF and PCRF elements, 211x and 214x, within the transit network 250, through Gi interface 1010, to support VoLTE roaming. That is, the P-CSCF element 211x interfaces directly with the transit IBCF 110x and TRF 215x, as if the visited LTE network 210d is fully equipped for supporting VoLTE roaming. According to another example embodiment, the visited LTE network 210e leverages a P-GW 216x hosted within the transit network 250, where the P-CSCF 211x and the PCRF 214x are also deployed. Such example architecture also enables the LTE network 210e to offer VoLTE roaming services without even bothering which of its local P-GW is needed to terminate the roamer's IP session for VoLTE service. The hosted P-GW 216x terminates the roamer's IP session and directly interfaces with the rest of the hosted elements, e.g., P-CSCF 211x, PCRF 214x, transit IBCF 110x and TRF 215x to fully support the VoLTE roaming for a roamer visiting the LTE network 210e. An approach to provide a local breakout function hosted in the transit network is described in patent application Ser. No. 13/827,996, "Method and System for Hub Breakout Roaming," filed Mar. 14, 2013, and incorporated by reference herein it its entirety.

It should be understood that the example embodiments described above may be implemented in many different ways. In some instances, the various methods and machines described herein may each be implemented by a physical, virtual or hybrid general purpose computer having a central processor, memory, disk or other mass storage, communication interface(s), input/output (I/O) device(s), and other peripherals. The general purpose computer is transformed into the machines that execute the methods described above, for example, by loading software instructions into a data processor, and then causing execution of the instructions to carry out the functions described, herein.

As is known in the art, such a computer may contain a system bus, where a bus is a set of hardware lines used for data transfer among the components of a computer or processing system. The bus or busses are essentially shared conduit(s) that connect different elements of the computer system, e.g., processor, disk storage, memory, input/output ports, network ports, etc., which enables the transfer of information between the elements. One or more central processor units are attached to the system bus and provide for the execution of computer instructions. Also attached to system bus are typically I/O device interfaces for connecting various input and output devices, e.g., keyboard, mouse, displays, printers, speakers, etc., to the computer. Network interface(s) allow the computer to connect to various other devices attached to a network. Memory provides volatile storage for computer software instructions and data used to implement an embodiment. Disk or other mass storage provides non-volatile storage for computer software instructions and data used to implement, for example, the various procedures described herein.

Embodiments may therefore typically be implemented in hardware, firmware, software, or any combination thereof.

In certain embodiments, the procedures, devices, and processes described herein constitute a computer program product, including a non-transitory computer-readable medium, e.g., a removable storage medium such as one or more DVD-ROM's, CD-ROM's, diskettes, tapes, etc., that provides at least a portion of the software instructions for the system. Such a computer program product can be installed by any suitable software installation procedure, as is well known in the art. In another embodiment, at least a portion of the software instructions may also be downloaded over a cable, communication and/or wireless connection.

Further, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etc.

It also should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and, thus, the data processors described herein are intended for purposes of illustration only and not as a limitation of the embodiments.

While this invention has been particularly shown and described with references to example embodiments thereof, it will be understood by those skilled in the art that various changes in form and details may be made therein without departing from the scope of the invention encompassed by the appended claims.

What is claimed is:

1. A method of handling signaling messages at a transit network connected between mobile networks, the method comprising:
   receiving, at the transit network, a session control message from a mobile network;
   determining, at the transit network, a signaling type associated with the session control message; and
   routing, at the transit network, the session control message based on the signaling type determined, including routing the session control message based on domain routing if the determined signaling type is roaming signaling and routing the session control message based on called party routing if the determined signaling type is non-roaming signaling.

2. The method of claim 1, wherein the session control message is a Session Initiation Protocol (SIP) INVITE message having a message header, and wherein determining includes determining that the signaling type is roaming signaling if transit and roaming function (TRF) information is present in the message header.

3. The method of claim 2, wherein determining further includes determining that the signaling type is non-roaming signaling if the TRF information is not present and the session control message is not sent from a visited network.

4. The method of claim 2, wherein routing the session control message based on domain routing includes routing the SIP INVITE message having TRF information present in the message header to an originating visited network if the message header further includes a loopback indicator, otherwise routing the SIP INVITE message having TRF information present in the message header to a home network.

5. The method of claim 1, wherein the session control message is a registration request message and the mobile network is a visited network, the method further comprising:
collecting, at the transit network, first information from the registration request message; and
routing the registration request message to a home network.

6. The method of claim 5 further comprising:
receiving, at the transit network, a registration response message from the home network;
collecting, at the transit network, second information from the registration response message; and
routing the registration response message to the visited network.

7. The method of claim 6, wherein the registration request and registration response messages correspond to Session Initiation Protocol (SIP) REGISTER messages.

8. The method of claim 6 further comprising:
analyzing the collected first and second information to make a routing decision for called party based routing.

9. The method of claim 8, wherein making a routing decision includes:
receiving, at the transit network, a routing request for a call from a service element, the routing request including called party information;
comparing, at the transit network, the called information against learned routing information in a database including at least one of the first and second information collected; and
routing the call based on learned routing information if the comparison indicates a match, otherwise routing the call based on default routing information.

10. The method of claim 9, wherein the learned routing information further includes information collected from call termination records.

11. The method of claim 1 further comprising:
receiving, at the transit network, a Session Initiation Protocol (SIP) INVITE message associated with a call originating from a visited mobile network;
detecting, at the transit network, absence of transit and roaming function (TRF) information in a message header of the SIP INVITE message;
modifying the message header of the SIP INVITE message to include TRF information associated with the transit network; and
routing the modified SIP INVITE message to a home mobile network.

12. The method of claim 11 further comprising:
receiving, at the transit network, from the home mobile network, a SIP INVITE having a loopback indicator in the message header; and
handling, at the transit network, delivery of the call on behalf of the visited mobile network.

13. A transit network system having one or more network service elements for providing voice-over-long term evolution (VoLTE) services between mobile networks, at least one of the network service elements configured to:
receive a session control message from a mobile network;
determining a signaling type associated with the session control message; and
route the session control message based on the signaling type determined, including route the session control message based on domain routing if the determined signaling type is roaming signaling and route the session control message based on called party routing if the determined signaling type is non-roaming signaling.

14. The transit network system of claim 13, wherein the session control message is a Session Initiation Protocol (SIP) INVITE message having a message header, and wherein in determining the signaling type, the at least one network element is further configured to determine that the signaling type is roaming signaling if transit and roaming function (TRF) information is present in the message header.

15. The transit network system of claim 14, wherein in determining the signaling type, the at least one network element is further configured to determine that the signaling type is non-roaming signaling if the TRF information is not present and the session control message is not sent from a visited network.

16. The transit network system of claim 14, wherein the at least one network element is further configured to route the SIP INVITE message having TRF information present in the message header to an originating visited network if the message header further includes a loopback indicator, otherwise route the SIP INVITE message having TRF information present in the message header to a home network.

17. The transit network system of claim 13, wherein the session control message is a registration request message, the mobile network is a visited network, and the at least one network element is further configured to:
collect first information from the registration request message; and
route the registration request message to a home network.

18. The transit network system of claim 17, wherein the at least one network element is further configured to:
receive a registration response message from the home network;
collect second information from the registration response message; and
route the registration response message to the visited network.

19. The transit network system of claim 18, wherein the registration request and registration response messages correspond to Session Initiation Protocol (SIP) REGISTER messages.

20. The transit network system of claim 18, wherein the at least one network element is further configured to:
analyze the collected first and second information to make a routing decision for called party based routing.

21. The transit network system of claim 20, wherein in making a routing decision, the at least one network element is configured to:
receive a routing request for a call from a service element, the routing request including called party information;
compare the called information against learned routing information in a database including at least one of the first and second information collected; and
route the call based on learned routing information if the comparison indicates a match, otherwise route the call based on default routing information.

22. The transit network system of claim 21, wherein the learned routing information further includes information collected from call termination records.

23. The transit network system of claim 13, wherein the at least one network element is further configured to:
receive a Session Initiation Protocol (SIP) INVITE message associated with a call originating from a visited mobile network;
detect absence of transit and roaming function (TRF) information in a message header of the SIP INVITE message;

modify the message header of the SIP INVITE message to include TRF information associated with the transit network; and route the modified SIP INVITE message to a home mobile network.

24. The transit network system of claim 23, wherein the at least one network element is further configured to:

receive from the home mobile network, a SIP INVITE having a loopback indicator in the message header; and handle delivery of the call on behalf of the visited mobile network.

25. The transit network system of claim 13, wherein the at least one network element includes:

at least one border element;

at least one router; and at least one processing device.

26. A non-transitory computer-readable medium comprising computer code instructions stored therein, the computer code instructions, when executed by at least one processor, cause a transit network system to perform the method according to claim 1.

27. A transit network system having network service elements for providing voice-over-long term evolution (VoLTE) services, at least one of the network service elements configured to host a visited mobile network operator (MNO) connected to the transit network system to allow the visited MNO to offer VoLTE roaming services to visiting user equipment.

28. The transit network system of claim 27 in which the at least one of the network service elements includes a transit and roaming function (TRF) service element.

29. The transit network system of claim 27 in which the at least one of the network service elements includes a Proxy-Call Session Control Function (P-CSCF) service element.

30. The transit network system of claim 27 in which the at least one of the network service elements includes a Packet Data Network Gateway (P-GW) service element.

31. The transit network system of claim 27 in which the at least one of the network service elements includes a Policy and Charging Rules Function (PCRF) service element.

* * * * *